United States Patent [19]

Lawson

[11] Patent Number: 5,113,173

[45] Date of Patent: May 12, 1992

[54] AUDIBLE WARNING ARRANGEMENT FOR SUPERCHARGED INTERNAL COMBUSTION ENGINE

[76] Inventor: William Lawson, 1815 N. U.S. 1, Ormond Beach, Fla. 32174

[21] Appl. No.: 616,833

[22] Filed: Nov. 21, 1990

Related U.S. Application Data

[63] Continuation-in-part of Ser. No. 374,835, Jul. 3, 1989, abandoned.

[51] Int. Cl.⁵ .............................................. B60Q 1/00
[52] U.S. Cl. ................................. 340/449; 123/198 D
[58] Field of Search ............... 116/22 R, 24, 101–103, 116/106, 138; 374/144; 123/41.15, 198 D; 340/404, 584, 449

[56] References Cited

U.S. PATENT DOCUMENTS

| 1,464,222 | 8/1923 | Sager | 116/102 |
| 3,872,821 | 3/1975 | Harada | 116/106 |
| 4,078,531 | 3/1978 | Hewitt | 340/449 X |
| 4,126,114 | 11/1978 | Davis | 123/198 D |
| 4,485,767 | 12/1984 | Baltz | 123/198 D X |
| 4,562,697 | 1/1986 | Lawson | 60/599 |

Primary Examiner—Jin F. Ng
Assistant Examiner—Brian R. Tumm
Attorney, Agent, or Firm—Oltman and Flynn

[57] ABSTRACT

An audible warning arrangement for a supercharged internal combustion engine, such as a turbocharged engine on a boat or truck. A thermostat valve senses the temperature in the air intake manifold of the engine. When this temperature becomes excessively high, the valve opens and passes pressurized air from the manifold into an air horn, which produces an audible warning signal.

3 Claims, 2 Drawing Sheets

AUDIBLE WARNING ARRANGEMENT FOR SUPERCHARGED INTERNAL COMBUSTION ENGINE

RELATED APPLICATION

This application is a continuation-in-part of copending application Ser. No. 07/374,835 filed Jul. 3, 1989, now abandoned.

SUMMARY OF THE INVENTION

This invention relates to an audible warning arrangement for a supercharged internal combustion engine to produce an audible alarm signal whenever the temperature in the air intake manifold of the engine becomes abnormally high, indicating that the engine is overloaded.

The present invention is particularly useful on a turbocharged marine diesel engine with an intercooler or on a turbocharged truck engine. In the case of a marine engine, if the intercooler's water intake is blocked while the engine is running (for example, if someone forgets to open the sea cocks) the intercooler becomes ineffective and the air intake temperature becomes unacceptably high. In the case of a truck engine, if the truck is going uphill for a long enough period of time, the intake air temperature can rise to an excessive level.

In accordance with the present invention, a thermostatically-operated valve is arranged to open and pass pressurized air from the engine intake manifold to an air-operated signalling device, preferably an air horn, to alert the operator of the boat, truck or other vehicle that the intake air temperature is too high.

In accordance with a further feature, a thermostat equipped with an electric switch is placed in the intake manifold, and a buzzer combined with a visible alarm is connected to the electric switch for attracting the attention of the person operating the engine.

In accordance with still another feature, an arrangement for stopping the engine is connected to the electric switch to prevent severe damage to the engine caused by prolonged overheating. A timing device may be inserted between the switch and the engine cut-off device to allow the engine to operate a short time in case the overheating condition is only temporary.

A principal object of this invention is to provide a novel and effective arrangement for signalling when the temperature in the air intake manifold of a supercharged internal combustion engine becomes too high.

Further objects and advantages of this invention will be apparent from the following detailed description of a presently preferred embodiment which is illustrated schematically in the accompanying drawing.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

DETAILED DESCRIPTION

Figure 1:
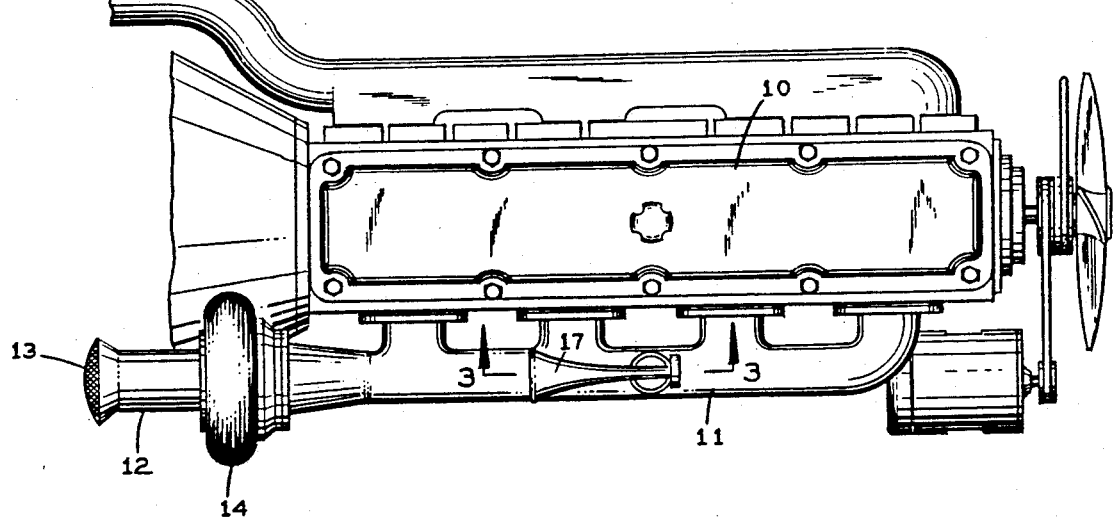
FIG. 1 is a top plan view of an internal combustion engine equipped with the present warning system.
Figure 2:
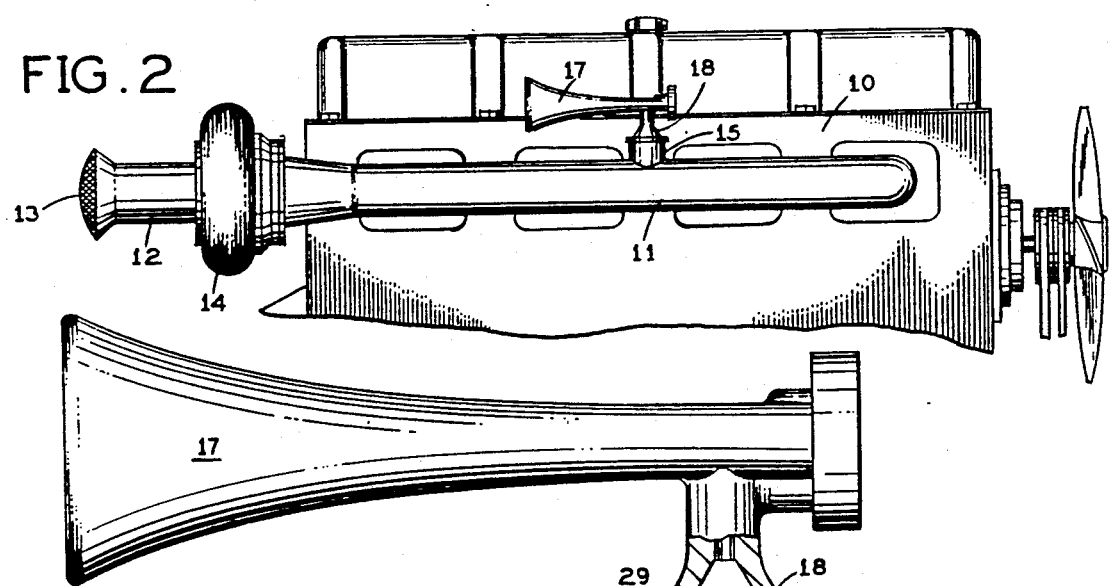
FIG. 2 is a side elevation.

Referring to FIGS. 1 and 2, an internal combustion engine 10 of known design has an air intake manifold 11 on one side. Manifold 11 has an air intake 12, at the left end in these Figures, covered by a screen 13. An air compressor 14 of known design draws ambient air in through the intake and delivers pressurized air to the engine intake manifold 11. The air compressor may be driven from the engine or it may be driven by a turbine (not shown) powered by the engine exhaust, for example. Also, the power plant may have an intercooler (not shown) for cooling the air before it enters the engine intake manifold 11, for example, as disclosed in my U.S. Pat. No. 4,562,697.

Figure 3:
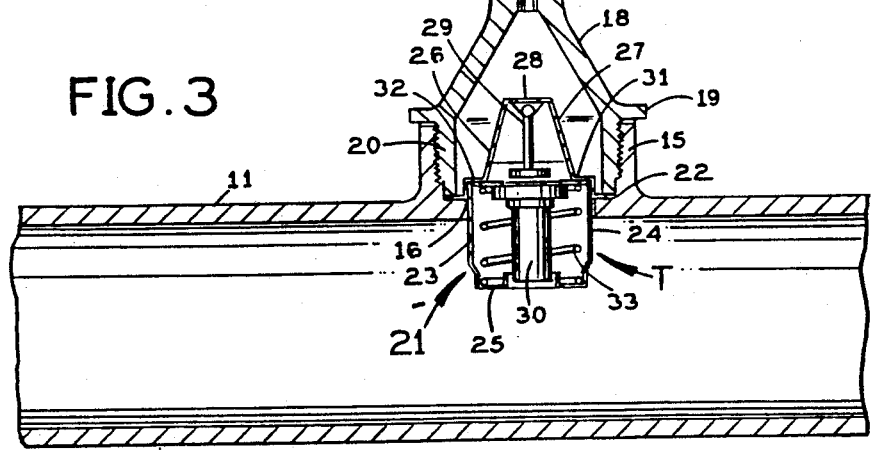
FIG. 3 is a fragmentary vertical longitudinal section taken along the line 3—3 in FIG. 1.

Referring to FIGS. 2 and 3, about midway along its length the intake manifold 11 has an upwardly extending, cylindrical, internally screw-threaded collar 15 extending up around a circular opening 16 in the top of the intake manifold. An air horn 17 of known design has a conical base segment 18 with a radially projecting horizontal flange 19 at its lower end extending across the top of the collar 15 on the intake manifold 11 and an externally screw-threaded neck 20 which is threadedly received in collar 15.

A thermostatically operated, normally-closed valve unit T of known design is positioned at the intake manifold opening 16 to pass air from intake manifold 11 into the air horn 17 to produce an audible warning or alarm signal when the air temperature in manifold 11 exceeds a predetermined safe level. For example, this thermostatically operated valve may be an "A1 Auto Valve" thermostat, model 30106, distributed in automotive parts stores by Auto Value Association, Inc., Chattanooga, Tenn. 37343.

Referring to FIG. 3, the valve unit T has a housing or base 21 with a flat, horizontal, annular, outwardly projecting flange 22 located about half-way up. Flange 22 is engaged in air-tight fashion between the top of manifold 11 around the opening 16 therein and the bottom of the neck 20 extending down from the air horn's base 18. Below this flange the housing 21 has a pair of downwardly extending segments 23 and 24 located diametrically opposite each other and separated by wide openings in the housing. An annular, inwardly projecting, horizontal, bottom segment 25 of the housing is joined to segments 23 and 24 at their lower ends. Above its flange 22 the housing has a pair of upwardly and inwardly inclined segments 26 and 27 located diametrically opposite each other and separated by wide openings in the housing. A top segment 28 of the housing is joined to the upper ends of segments 26 and 27 and extends between them.

A vertical guide rod 29 is held fixedly by the top segment 28 of housing 21 and extends down from it centrally of the housing. A plunger assembly 30 is slidably mounted on guide rod 29. This plunger assembly is exposed to the temperature in intake manifold 11 through the wide openings between the downwardly extending segments 23 and 24 of housing 21. Plunger assembly 30 has a temperature-sensitive arrangement of known design (not shown) which causes it to move down along guide rod 29 when the temperature in intake manifold 11 exceeds a predetermined value, such as 160 degrees F., for example.

Near its upper end the plunger assembly has a radially outwardly projecting, horizontal, annular valve member 31 that is engageable in air-tight fashion with the bottom face of a horizontal, radially extending, annular segment 32 of housing 21, which provides a valve seat. A coil spring 33 is engaged under compression between the bottom segment 25 of housing 21 and valve member 31.

Normally, spring 33 biases the plunger assembly 30 up along guide rod 29 and holds valve member 31 seated against the bottom face of housing segment 32, so that it blocks air in the intake manifold 11 from passing up into the air horn. However, when the air temperature in manifold 11 exceeds a predetermined value, the temperature-sensitive arrangement in plunger 30 causes it to move down and unseat valve member 31 from its valve seat, permitting pressurized air to flow up from manifold 11 into the neck 20 on the bottom of the air horn and from there up through the base 18 into the air horn causing the air horn to produce an audible signal that tells the driver of the boat, truck or other vehicle that the vehicle engine is overloaded.

Figure 4:
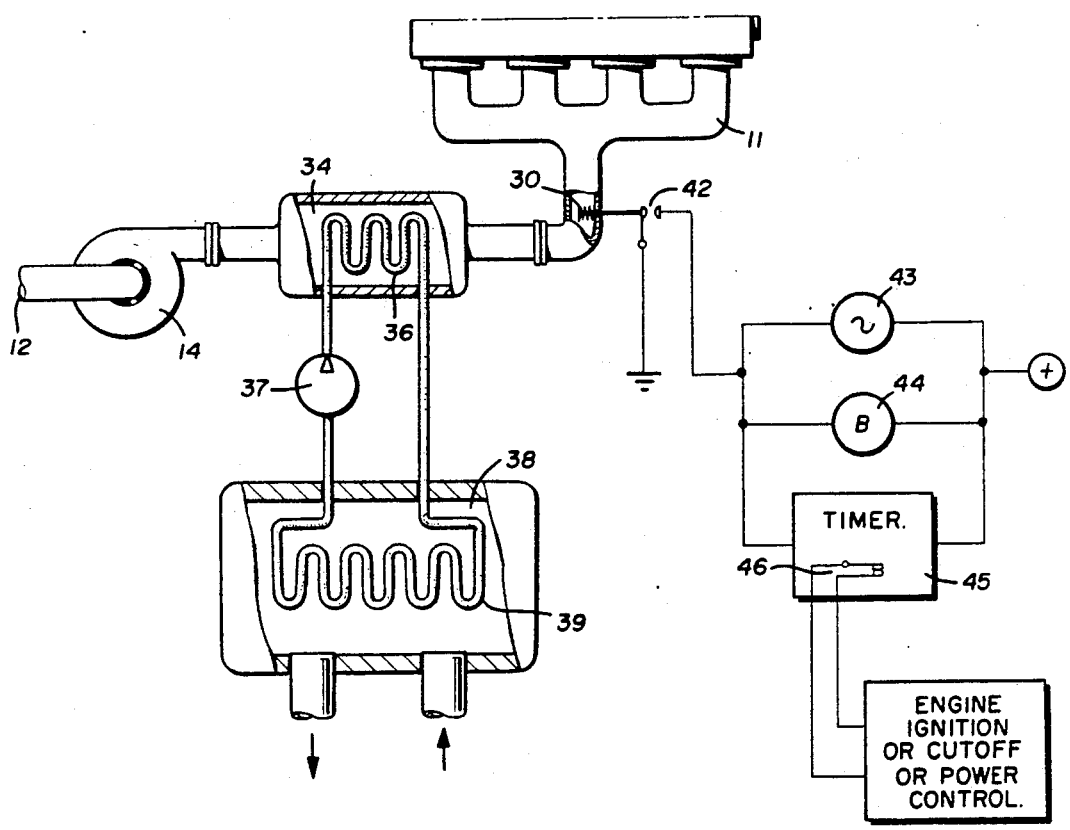
FIG. 4 is a diagrammatic representation of an electrically controlled engine warning and protection system.

FIG. 4 shows in diagrammatic form an electrically controlled engine warning and protection system, which includes, as described above, a turbocharger 14 connected to an intercooler 34 for cooling the compressed hot air from the turbocharger. The intercooler has a core 36 in which cold water or cooling fluid is flowing under pressure of a circulation pump 37 which may be driven by the engine or electrically. The cooling fluid circulates back to a core 39 of an intercooler radiator 38, which is in turn cooled by either cold sea water, or air. A thermostat 30 is placed in the inlet to the intake manifold 11.

The thermostat is coupled in conventional manner to a switch 42 with contacts that operate when the thermostat senses a temperature above a given safe value. When that happens, a circuit is closed between plus (+) battery and ground which activates indicator light 43 mounted e.g. on the engine dashboard or control panel. At the same time a buzzer or similar audible alarm 44 is activated to attract the engine operator's attention. In addition, a timer 45 set to a reasonable time interval, e.g. 1 to 3 minutes, is activated. The timer 45 may, for example, be a slow operating relay of well known construction, with a switch 46 connected to, for example, the engine ignition or some other convenient engine cut-off control, e.g. fuel supply. The time interval is selected such that occasional short periods of overload do not shut off the engine, and so that the engine operator, after getting a first warning from the light indicator 43, or the audible indicator 44, has time to either take corrective action or be prepared for an engine stop.

As an alternative measure, instead of completely stopping the engine, the switch 46 may be connected to the engine power controls or control computer to reduce the engine power setting to a reduced safe value.

I claim:

1. On an internal combustion engine having a supercharger and an air intake manifold conducting pressurized air from the supercharger to the engine, the improvement which comprises:

an air-operated alarm device;

and a normally-closed thermostat valve connected between said intake manifold and said alarm device and having temperature-sensing means exposed the pressurized air in said intake manifold to sense the temperature of said air, said valve being operative in response to an abnormally high temperature in said intake manifold to open and pass pressurized air from said manifold to said alarm device to cause said alarm device to produce an alarm signal; further including a visual alarm coupled to said temperature-sensing means; a timer coupled to said temperature-sensing means, and engine cut-off means coupled to said timer; and engine power reduction means coupled to said timer.

2. An apparatus according to claim 1 wherein said alarm device is an audible alarm device.

3. An apparatus according to claim 2 wherein said alarm device is an air horn.

* * * * *